United States Patent [19]

Hofmann et al.

[11] Patent Number: 4,788,670
[45] Date of Patent: Nov. 29, 1988

[54] CLOCK VOLTAGE SUPPLY

[75] Inventors: Hermann Hofmann, Erlangen, Fed. Rep. of Germany; David Johnson, Portland, Oreg.; Werner Schirl, Nuremberg; Hans-Peter Troendle, Erlangen, both of Fed. Rep. of Germany

[73] Assignee: Siemens Aktiengesellschaft, Berlin and Munich, Fed. Rep. of Germany

[21] Appl. No.: 86,428

[22] Filed: Aug. 18, 1987

[51] Int. Cl.⁴ .......................... G04F 8/00; H03L 7/00; H03K 1/02
[52] U.S. Cl. .................................. 368/119; 368/156; 307/269; 331/2; 371/36; 371/68
[58] Field of Search .................. 368/113, 119, 120; 307/269, 480; 331/2, 46, 55, 56; 371/36, 68; 375/107, 108, 118–120

[56] References Cited

U.S. PATENT DOCUMENTS

| | | | |
|---|---|---|---|
| 3,900,741 | 8/1975 | Fletcher | 371/68 |
| 4,096,396 | 6/1978 | Belforte et al. | 307/269 |
| 4,227,158 | 10/1980 | Schroeder et al. | 331/2 |
| 4,276,645 | 6/1981 | Lager et al. | 371/68 |
| 4,497,059 | 1/1985 | Smith | 371/36 |
| 4,521,745 | 6/1985 | Falconer | 331/2 |
| 4,659,999 | 4/1987 | Motoyama et al. | 331/2 |
| 4,683,570 | 7/1987 | Bedard et al. | 371/36 |

OTHER PUBLICATIONS

Article from FTCS-11 The Eleventh Annual International Symposium on Fault-Tolerant Computing, titled "Fault-Tolerant Clocking System" by T. Basil Smith; IEEE Catalog No. 81CH1600-6.

*Primary Examiner*—Vit W. Miska
*Attorney, Agent, or Firm*—James G. Morrow

[57] ABSTRACT

A clock voltage supply for electronic control circuits such as a computer system for generating four clock signals which are synchronous as to frequency and phase. When n=4, the clock signals are generated with the help of four PLL clocks. So that the four clock signals can continue to appear even if one of the four clocks is malfunctioning, the clock signals of the four clocks are supplied to four (3:4) voters from whose outputs the clock signals are then supplied. Since each voter circuit brings about a certain delay time, which significantly limits the frequency of the clock signals, a delay element is connected downstream to each of the voter outputs respectively. The delay time of the respective delay element, plus the delay time of the respective voter connected therewith, is an integral multiple of the period of the intended clock frequency. For PLL control, the output of each delay element gives the nominal phase position and the output of each clock gives the actual phase position.

5 Claims, 2 Drawing Sheets

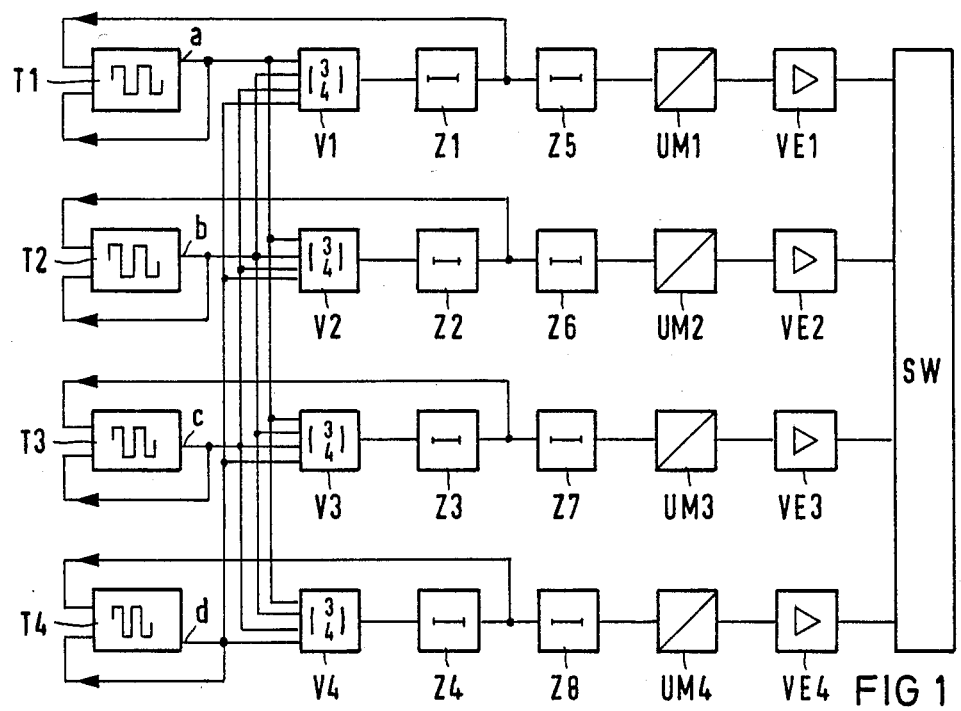
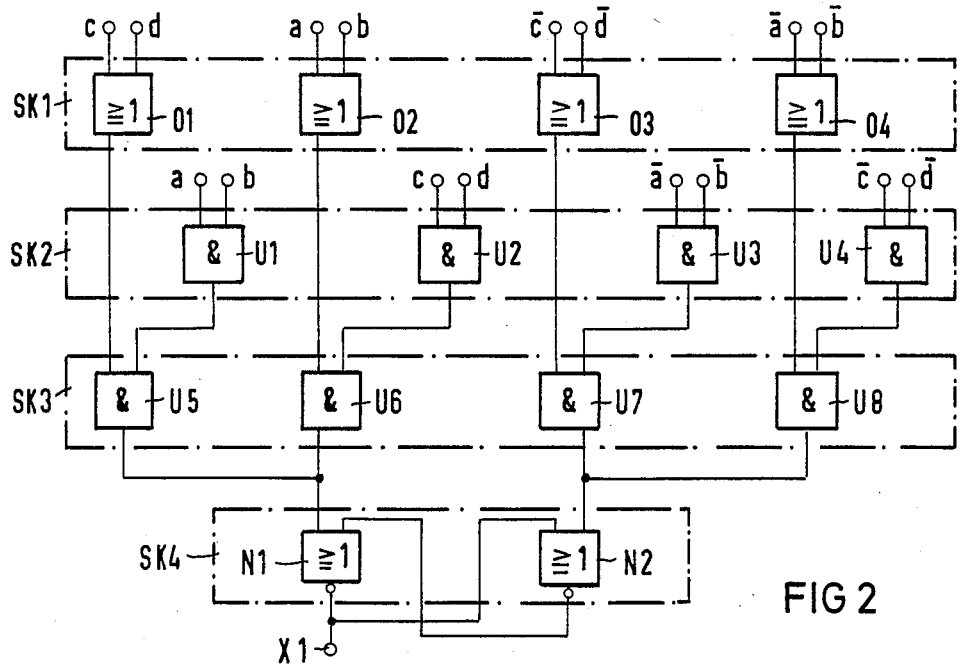

CLOCK VOLTAGE SUPPLY

FIELD OF INVENTION

This invention relates to electronic control circuits and more particularly to a clock voltage supply for the generation of multiple clock signals at a predetermined nominal frequency, synchronous with regard to frequency and phase.

BACKGROUND OF THE INVENTION

Electronic control circuits, especially electronic computer systems, are known to provide multiple parallel, phase-controlled clock lines. Such a clock voltage supply is known, for example, from the 1981 IEEE publication "Fault-Tolerant Clocking System" by T. Basil Smith. The individual clock signals in such clock voltage supplies described in this publication can each manifest a phase shift of only a small fraction of a clock cycle relative to one another for the system to operate properly. Also, according to the design shown by T. Basil, the clock frequency levels are critically limited by the time delays brought about in the circuitry and processing of the voters.

SUMMARY OF THE INVENTION

It is an object of this invention to create a clock voltage supply having n multiple parallel phase controlled clock lines for n>1 in which very high clock frequencies can be attained for synchronous clock signals. It is another object of this invention to provide such a clock voltage supply at a relatively low cost in circuitry.

Briefly stated in accordance with one aspect of the invention, the aforementioned objectives are achieved by providing a clock voltage supply for generating multiple parallel clock signals at a predetermined reference frequency, synchronous one to another as to frequency and phase, for an electronic control circuit, in particular a computer system, having n parallel, phase-controllable clocks and outputs which are each respectively connected to one input of n corresponding voters, where n is any whole number greater than 1. This clock voltage supply also includes all possible combinations of input signals to output signals in each of the voters which are achieved by means of a concatenation of logic circuits wherein the total delay time for each respective concatenation corresponds to a predetermined reference value for each such concatenation stage. The clock also includes a first delay element connected downstream of each of the voters having a predetermined delay time which is the sum of the first delay element time plus the delay time of the corresponding voter equal to an integral multiple of the period of the predetermined reference frequency, and a phase control means of the clock signals, including respective clock output signal, as an actual phase input, and the respective output signal of the delay element associated therewith as a reference phase value. The invention thus makes use of the fact that in phase-controllable clocks only discrepancies between the actual phase value and the nominal phase value are detected, it being possible for the phase positions to lie within a time slot pattern in the clock pulse period.

A first preferred embodiment of the invention is characterized by the fact that, for the corresponding circuits of the concatenations, logical circuits are provided in each case, which are elements of an integrated circuit associated with each concatenation. To be sure, the gate delay times, i.e., the delay times of the individual circuits, of integrated circuits that come from various production batches may differ substantially from one another; the delay time differences of the individual logic circuits within the same integrated circuit, however, are decidedly slight. Thus, the sum of the delay times of all concatenations is nearly the same in every parallel branch.

A further preferred embodiment of the invention is characterized by the fact that each clock has, at its output, a storage element controlled by the trailing edge of the clock pulse. Thus, in a markedly simple manner, a duty cycle ratio of 1:1 is ensured for each of the clock signals.

A further preferred embodiment of the invention is characterized by the fact that cascaded with each first delay element a series circuit is connected consisting of driver elements and further delay elements, the delay time of each of the further delay elements being selected such that the clock signals at the outputs of the series circuits also remain phase-synchronized relative to one another. In this manner, even if a certain delay time is due to driver elements for level matching and for amplification of the clock signals, an unambiguous synchronization of the channels relative to one another as to frequency and phase is ensured.

BRIEF DESCRIPTION OF THE DRAWINGS

While the specification concludes with claims particularly pointing out and distinctly claiming the subject matter which is regarded as the invention, it is believed that the invention will be better understood from the following description of the preferred embodiment taken in conjunction with the accompanying drawings in which:

FIG. 1 shows a block diagram of a four-channel clocked voltage supply;

FIG. 2 shows a functional block diagram of the structure of a (3:4) voter;

DESCRIPTION OF A PREFERRED EMBODIMENT

Figure 3:
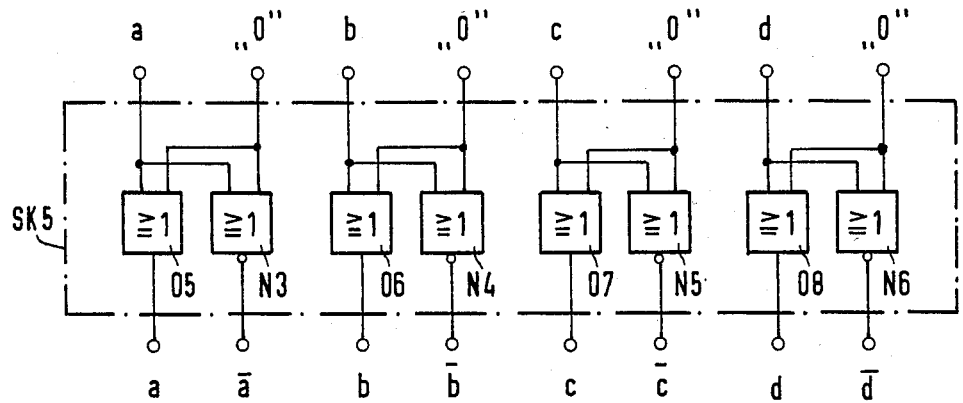
FIG. 3 shows functional block diagram of an input circuit usable for the (3:4) voter.

FIG. 1 shows a clock voltage supply in which four clock signals, synchronous with respect to frequency and phase, are generated for an electronic control circuit SW, such as a computer system. For this purpose four, phase-controllable clocks T1 to T4 using PLL principles are provided, whose output signals a, b, c and d are each connected to voters V1 to V4. Each of the voters V1 to V4 is a (3:4) voter; that is, if three of the four inputs have the same signal, then, on the basis of a majority decision, the majority signal is passed through as the effective signal to the output of that voter. This is true for all voters, V1 to V4, concerned. For said purpose, each of the voters V1 to V4 exhibits an internal logic that will be explained in detail in connection with FIGS. 2 and 3. However, one should mention that a predetermined delay time is introduced by each of the voters V1 to V4. Said delay time for each of the voters V1 to V4 is further prolonged, with the help of a timing element Z1 to Z4, which takes the form of a delay element, in such a way that the delay time of voter V1 plus the delay time of timing element Z1 is an integral multiple (1, 2, ..., N times) of the period of the clock signal. The same holds for other voters V2 to V4 and the respective timing elements Z2 to Z4 associated therewith.

The phase control of clocks T1 to T4 is achieved by virtue of the fact that the output signal of the corresponding clock T1 to T4 is used as the actual phase value in each case, while the output signal of the associated timing element Z1 to Z4 is used as the reference phase value in each case. Thus, the signal at the output of the timing elements Z1 to Z4 in each case is one of the four clock signals to be generated by the clock voltage supply V1–V4 the four clock signals a–b being synchronous with one another as to frequency and phase.

If the control circuit SW requires clock signals whose level and power differ from the clock signals at the output of the first timing elements Z1 to Z4, it is necessary to connect downstream of each of the first timing elements Z1 to Z4 a converter UM1 to UM4, serving as a level converter, and to use amplifiers VE1 to VE4 to amplify the signals of the converters UM1 to UM4. As, however, the converters UM1 to UM4 and the amplifiers VE1 to VE4 bring about design-dependent delay times for the clock signals, it is advantageous to include in the channel for each of the clock signals a further timing element Z5 to Z8 in each case, the delay time of each of the further timing elements Z5 to Z8 being selected such that the clock signals at the outputs of the series circuits consisting of timing elements Z5 to Z8, converters UM1 to UM4 and amplifiers VE1 to VE4 also remain synchronized with one another with respect to phase.

The illustration of FIG. 2 shows the block diagram of one of the (3:4) voters, in the embodiment of the voter V1. As input signals, the output signals a, b, c and d of the clocks T1 to T4 as well as their inverse signals a', b', c' and d' are supplied to the voter. The generation of the inverse signals a', b', c' and d' is explained later in the description of FIG. 3.

The input signals a to d are connected with one another in the present (3:4) selection in such a way that a logical "1" signal is always present at an output X1 of the voter V1 if one of the following conditions is satisfied:

The input signals a, b and c; the input signals a, b and d; the input signals a, c and d; or the input signals b, c and d exhibit the value of logical "1". This is combining rule I.

The signal at the output X1 is a logical "0" if: the input signals a', b' and c', input signals a', b' and d'; the input signals a', c' and d'; or the input signals b', c' and d' exhibit the value of logical "1". This is combining rule II.

For this purpose, the input signals c and d are supplied to an OR element O1, the input signals a and b are supplied to an OR element O2, the input signals a' and d' are supplied to an OR element O3, and the input signals a' and b' are supplied to an OR element O4. Said OR elements O1 to O4 are elements of an integrated circuit SK1, as is shown by a dashed line in the illustration. The input signals a and b are further supplied to an AND element U1, the input signals c and d are supplied to an AND element U2, the input signals a' and b' are supplied to an AND element U3, and the input signals c' and d' are supplied to an AND element U4. The AND elements U1 to U4 are elements of an integrated circuit SK2 shown by a dashed line below SK1. The output signals of the OR element O1 and of the AND element U1 are combined with each other in an AND element U5, the output signals of the OR element O2 and of the AND element U2 are combined with each other in an AND element U6, the output signals of the OR element O3 and of the AND element U3 are combined with each other in an AND element U7, and the output signals of the OR element O4 and of the AND element U4 are combined with each other in an AND element U8. The AND elements U5 to U8 are elements of an integrated circuit SK3, as is also shown by a dashed line. The AND elements U5 and U6 have their outputs connected to each other; similarly, the outputs of the AND elements U7 and U8 are connected to each other. Thus, the first condition stated above, i.e., combining rule I, is satisfied at the output of the AND elements U5 and U6. At the output of the AND elements U7 and U8, combining rule II is satisfied in inverse form; that is, the output signal takes the value logical "1" when the input signals are as stated above.

The logical "1" output signals of the AND elements U5 and U6 represent a SET signal for a bistable storage element, which consists of two NOR elements N1 and N2 that are elements of an integrated circuit SK4, shown by dashed line. The logical "1" output signals of the AND elements U7 and U8 represents the RESET signal for said bistable storage element. For said purpose, the output signal of the AND elements U5 and U6 is supplied to a first input of the NOR element N1, and the output signal of the AND elements U7 and U8 is supplied to a first input of the NOR element N2. The output of the NOR element N1 is coupled back to a second input of the NOR element N2, and the output of the NOR element N2 is coupled back to a second input of the NOR element N1. The output signal of the voter V1 can be taken from the output of the NOR element N1. The correspondence of the output signal at the output X1 with a logic "1" value at the output of the AND elements U5 and U6 insures compliance with combining rule I. If the bistable storage element is in a logic "1" state, the output signal of the AND elements U7 and U8 resets the said bistable storage element to logic "0," and so combining rule II is satisfied for the output signal at the output X1.

The circuit of FIG. 2 permits that a logic "0" value exists at the output X1 whenever three of the four clock signals take on the value of logic "0," and that whenever three of the four clock signals a to d take on the value of logic "1", the value of logic "1" will also exist at the output X1. A failure of one of the clocks T1 to T4 thus does not lead to a malfunction, and a defective clock T1 to T4 can even be replaced while the clock voltage supply is in operation.

For all possible combinations of input signals to output signals, the signal passes through the same elements of integrated circuits SK1 to SK4 in every case, and this fact implies that an equal, predetermined nominal value will be attained in each case for the delay time of the respective voter.

The illustration of FIG. 3 shows an input circuit for the voter of FIG. 2, in which inverted signals a' to d' are derived from the output signals a to d of the clocks T1 to T4. In the same way, each of the non-inverted clock signals a to d is delayed by the delay time determined by said process. For this purpose, OR elements O5 to O8 as well as NOR elements N3 to N6 are provided on an integrated circuit SK5. Each of the combinations: the OR element O5 and the NOR element N3, the OR element O6 and the NOR element N4, the OR element O7 and the NOR element N5, and the OR element O8 and the NOR element N6, is designed as a circuit with the same delay time for both the OR and the NOR combination. In each case, the non-inverted clock signal a, b, c or d is supplied to the input of the OR element O5 and of the NOR element N3, the OR element O6 and the NOR element N4, the OR element O7 and the NOR element N5, or the OR element O8 and the NOR element N6. In each case, the second input of the OR elements O5 to O8 and of the NOR elements N3 to N6 is permanently supplied with a logical "0" signal. Thus, the signal at each of the outputs of the OR elements O5 to O8 is the non-inverted clock signal of the clocks T1 to T4, while the signal at each of the outputs of the NOR elements N3 to N6 is in each case the inverted clock signal a', b', c' and d' of the clocks T1 to T4. Said same output signals of the circuit of FIG. 3 can be used as input signals for the circuit of FIG. 2.

Figure 4:
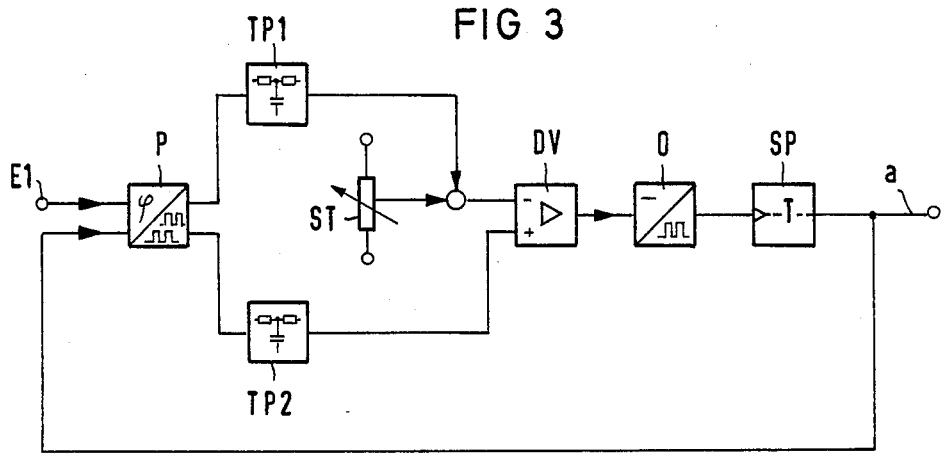
FIG. 4 shows a functional block diagram of a clock embodiment.

The illustration of FIG. 4 shows the mode of functioning of the clocks, for example of clock T1. To produce the oscillations, the clock T1 contains a voltage-controlled oscillator O, whose output signal is supplied to a storage element SP controlled by the edge of the clock pulse. The storage element SP controlled by the edge of the clock pulse ensures that the signal supplied by the oscillator O is converted into the clock signal a and that the same clock signal exhibits a duty cycle ratio of 1:1.

The control voltage for the oscillator O is generated in the following manner. The clock signal at the output of the storage element SP is supplied to the first input of a phase detector P as the actual phase value signal, and the output signal of the associated voter, in this case of the voter V1, is further supplied to said phase detector via input E1 as the reference phase value.

The phase detector P is designed in such a way that through a first output it supplies a first control signal to a low-pass filter TP1, when the actual phase lags the reference phase, and that through a second output it supplies a control signal to a low-pass filter TP2 when the actual phase leads the reference phase. The control signals exhibit a fundamental frequency that matches the frequency at the output of the storage element SP, the duty cycle ratio of said control signals representing in each case a measure of the magnitude of the phase difference or phase displacement. A phase difference small in magnitude leads to a low duty cycle ratio, and a phase difference large in magnitude leads to a high duty cycle ratio.

The low-pass filter TP1 and the low-pass filter TP2 supply, at the output of each, a control voltage that identifies the DC component of the first and second control signal, respectively. The signal at the output of the low-pass filter TP1 is thus an analog control voltage, whose magnitude is proportional to the detected phase shift when the actual phase is lagging.

The control voltage at the output of the low-pass filter TP1 is additively combined with a voltage preset by a setting element ST; the setting element accordingly determines the fundamental frequency of the oscillator O. The sum signal is supplied to the inverting input of a proportional differential amplifier DV, whose non-inverting input is connected to the output of the low-pass filter TP2. In the ideal case, that is, if the phase difference is zero, the output signal of the differential amplifier D' is determined only by the preset control voltage from the actuator ST, for example from a voltage divider. Departures from this ideal case vary the output voltage of the differential amplifier DV and thus control the frequency of the oscillator O.

It will now be understood that there has been disclosed a new multiple parallel output clock voltage supply. As will be evident from the foregoing description, certain aspects of the invention are not limited to the particular details of the examples illustrated, and it is therefore contemplated that other modifications or applications will occur to those skilled in the art. It is accordingly intended that the claims shall cover all such modifications and applications as do not depart from the true spirit and script of the invention.

What is claimed as new and desired to be secured by Letters Patent of the United States is:

1. A clock voltage supply for generating multiple parallel clock signals at a predetermined reference frequency for an electronic control circuit having N phase-controllable clocks and N voters, each phase controllable clock having an output which is connected to one input of each of N voters, wherein N is an integer greater than one and the parallel clock signals are synchronous to each other in frequency and phase, comprising:

a concatenation of a plurality of logic circuits for combining input signals and output signals in each of the voters;

means for providing a delay time for the concatenation of a plurality of logic circuits, wherein the delay time corresponds to a predetermined reference value;

at least one delay element having a first delay time, the delay element being connected downstream of one of the voters, the voter having a predetermined delay time, the predetermined delay time being the sum of the first delay time and a corresponding voter delay time, the corresponding voter delay time being equal to an integer multiple of the period of a predetermined reference frequency; and means for controlling the phase of the parallel clock signals utilizing a clock output signal and the output signal of the delay element associated therewith, the clock output signal being an actual phase input and the output signal being a reference phase value.

2. A clock voltage supply in accordance with claim 1, wherein the concatenation of the plurality of logic circuits is a single integrated circuit.

3. A clock voltage supply in accordance with claim 1, wherein each clock has connected to its output a storage element controlled by an edge of the clock signal.

4. A clock voltage supply in accordance with claim 2, wherein each clock has connected to its output a storage element controlled by an edge of the clock signal.

5. A clock voltage supply in accordance with claim 1, further comprising a series circuit consisting of driver elements and further delay elements connected downstream of each first delay element, the delay time of each of the further delay elements being selected such that the clock signals at the outputs of the series circuits also remain synchronous relative to one another with respect to phase.

* * * * *